United States Patent
Brand et al.

(10) Patent No.: US 8,408,282 B2
(45) Date of Patent: Apr. 2, 2013

(54) HEAT EXCHANGE DEVICE AND METHOD

(75) Inventors: Joseph Horace Brand, Mississauga (CA); Kevin Allan Dooley, Mississauga (CA); Cameron Todd Walters, Newmarket (CA); Michael Dowhan, Milton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 178 days.

(21) Appl. No.: 12/484,735

(22) Filed: Jun. 15, 2009

(65) Prior Publication Data

US 2009/0255652 A1 Oct. 15, 2009

Related U.S. Application Data

(63) Continuation of application No. 10/864,360, filed on Jun. 10, 2004, now abandoned.

(51) Int. Cl.
*F28F 7/00* (2006.01)
*H02K 9/00* (2006.01)

(52) U.S. Cl. .......................................... 165/80.4; 310/54

(58) Field of Classification Search ................. 165/80.3, 165/185, 104.33, 80.4, 102, 88; 310/52, 310/54, 64; 361/699
See application file for complete search history.

(56) References Cited

U.S. PATENT DOCUMENTS

| | | | | |
|---|---|---|---|---|
| 1,748,252 A | * | 2/1930 | Sundstedt | 244/105 |
| 2,571,872 A | * | 10/1951 | Hayes | 310/54 |
| 3,009,072 A | * | 11/1961 | Mossay | 310/57 |
| 3,447,002 A | * | 5/1969 | Ronnevig | 310/54 |
| 3,597,645 A | | 8/1971 | Duffert et al. | |
| 3,835,923 A | | 9/1974 | Platell | |
| 4,304,296 A | * | 12/1981 | Shaffer | 165/125 |
| 4,516,044 A | | 5/1985 | Bone | |
| 4,709,177 A | * | 11/1987 | Kaminski | 310/59 |
| 4,798,241 A | | 1/1989 | Jarrett et al. | |
| 4,899,812 A | | 2/1990 | Altoz | |
| RE33,528 E | | 1/1991 | Doty | |
| 5,291,943 A | | 3/1994 | Dhir | |
| 5,491,371 A | | 2/1996 | Ooi | |
| 5,509,468 A | * | 4/1996 | Lopez | 165/144 |
| 5,623,175 A | | 4/1997 | Ronning et al. | |
| 5,638,900 A | | 6/1997 | Lowenstein et al. | |
| 5,744,880 A | * | 4/1998 | Kudoh et al. | 310/58 |
| RE35,890 E | | 9/1998 | So | |
| 6,453,989 B1 | | 9/2002 | Watanabe et al. | |
| 6,498,408 B2 | | 12/2002 | Tong et al. | |
| 6,504,274 B2 | | 1/2003 | Bunker et al. | |
| 6,615,911 B1 | | 9/2003 | Bhatti et al. | |
| 6,628,020 B1 | | 9/2003 | Tong | |
| 6,634,421 B2 | | 10/2003 | Ognibene et al. | |
| 6,761,211 B2 | * | 7/2004 | Bhatti et al. | 165/80.3 |
| 6,992,411 B2 | * | 1/2006 | Houle et al. | 310/52 |
| 2001/0035285 A1 | | 11/2001 | Ognibene et al. | |

FOREIGN PATENT DOCUMENTS

CA 2400982 9/2001

OTHER PUBLICATIONS

Incropera, Frank P. and DeWitt, David P. Fundamentas of Heat and Mass Transfer, Fourth Edition John Wiley & Sons. 1996 pp. 420-421.
International Search Report of PCT/CA2005/000911.

* cited by examiner

*Primary Examiner* — Tho V Duong
(74) *Attorney, Agent, or Firm* — Norton Rose Canada LLP (57) ABSTRACT

A heat exchange device comprising a fluid flow passage having a plurality of successive segments in fluid flow communication with one another, the segments being adapted to maintain a developing flow therein and thereby improve heat transfer.

13 Claims, 6 Drawing Sheets

HEAT EXCHANGE DEVICE AND METHOD

CROSS-REFERENCE TO RELATED APPLICATIONS

This application is a continuation of U.S. patent application Ser. No. 10/864,360 filed Jun. 10, 2004 now abandoned the entire contents of which is incorporated herein by reference.

TECHNICAL FIELD

The present invention relates generally to a method and device for improving heat transfer.

BACKGROUND OF THE ART

Heat exchange devices typically direct a coolant fluid through cooling passages to exchange heat between the surrounding body and the fluid by convective heat transfer. However, small equipment for example may require smaller cooling channels, but the small dimensions of such cooling channels can make cooling less effective, particularly when the cooling fluid is viscous (e.g. oil) and the fluid velocities are low. Therefore, improved heat exchange devices are needed.

SUMMARY OF THE INVENTION

One aspect of the present invention provides an improved heat exchange device and a method for improved heat transfer between a body and an adjacent fluid flow.

In accordance with the present invention there is provided a heat exchange device comprising a body defining at least one tortuous passage adapted to direct a heat transfer fluid therethrough, said passage having at least a plurality of successive segments in serial fluid flow communication, each of said segments having a length less than a length required for said fluid to achieve a fully developed laminar flow therein, thereby increasing convective heat transfer efficiency by causing a pipe inlet effect throughout said fluid flow passage.

In accordance with the present invention, there is also provided a method of improving heat transfer between a body and a fluid passing through a passage and adjacent the body, the method comprising the steps of: determining a threshold segment geometry, said threshold segment geometry being a passage length required for said fluid travelling through said passage to become fully developed laminar flow therein; providing said passage adjacent the body, the passage having a plurality of segments in serial fluid flow communication, each segment having geometry relative to said threshold segment geometry such that fluid passing through said segment cannot become fully developed laminar flow; and directing said fluid through said passage such that a developing flow is maintained in said segments.

There is further provided, in accordance with the present invention, a method of improving heat transfer between a body and a fluid passing through a passage adjacent the body, the method comprising the steps of: selecting a passage geometry having a plurality of successive segments, the passage geometry selected relative to the fluid to provide a desired Nusselt number for each of said successive segments, wherein said desired Nusselt is provided in a range between a Nusselt number corresponding to an inlet flow into the segment and a Nusselt number corresponding to a fully developed laminar flow in the segment; providing a passage comprised of said passage geometry; and directing the fluid through the passage.

There is also provided, in accordance with the present invention, a heat exchange device comprising a body including at least one passage adapted to direct a heat transfer fluid therethrough and adjacent the body, said passage including a plurality of successive segments in serial fluid flow communication with one another, in use each of said segments adapted to maintain the heat transfer fluid in a developing flow state when directed therethrough, wherein the segments are so adapted by reason of their respective geometries relative to one another.

Further details of these and other aspects of the present invention will be apparent from the detailed description and Figures included below.

DESCRIPTION OF THE DRAWINGS

Reference is now made to the accompanying Figures depicting aspects of the present invention, in which.

DETAILED DESCRIPTION OF PREFERRED EMBODIMENTS

The present invention has application in a wide variety of environments, however the skilled reader will appreciate that, although the invention may be adequately described with reference to a single environment (such as the electric machine described below), application of the invention is by no means limited to the specific example described. The following example is therefore but one of many applications to which the invention may be applied.

Figure 1:
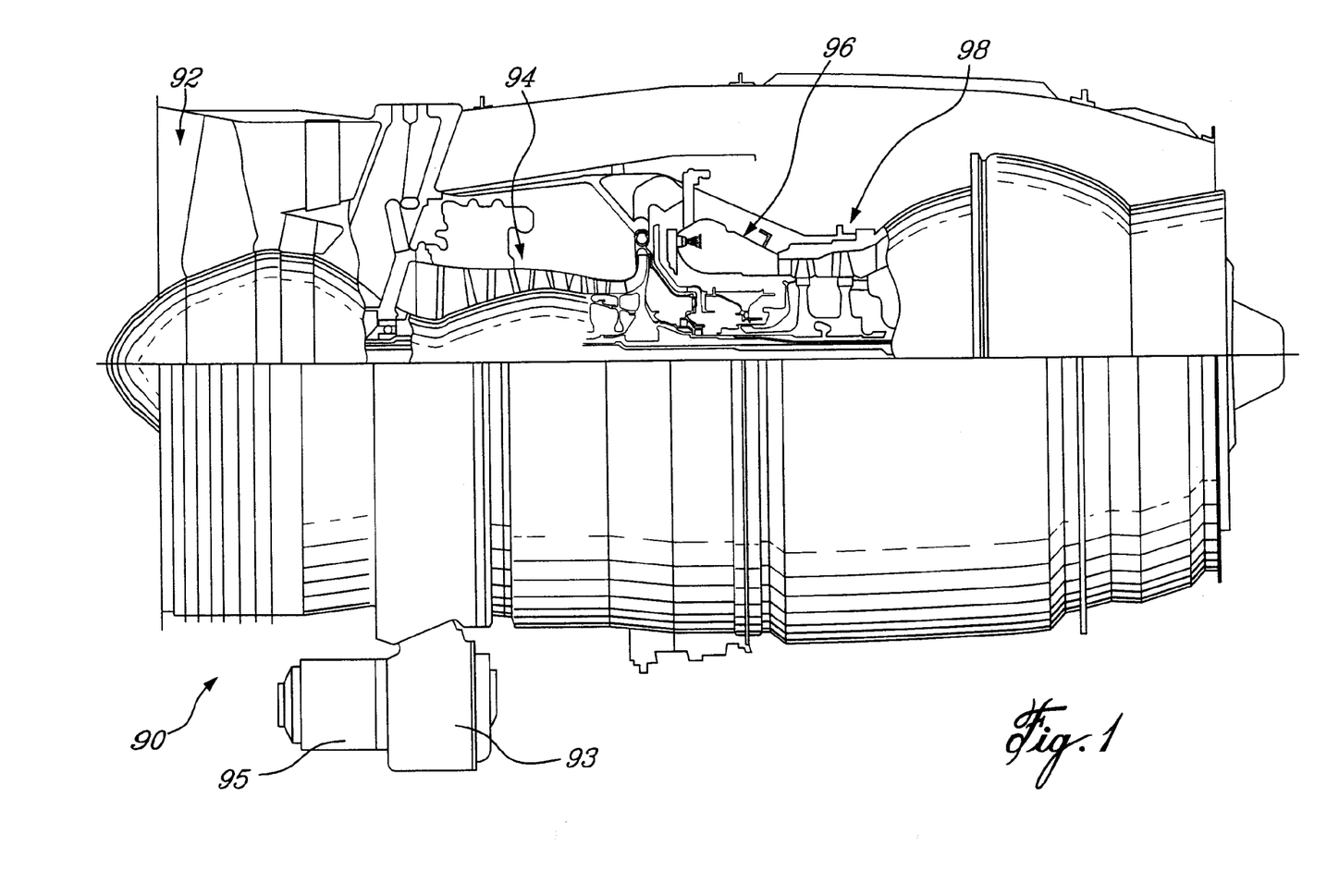
FIG. 1 shows a schematic partial cross-section of a gas turbine engine.

FIG. 1 illustrates a gas turbine engine 90 of a type preferably provided for use in subsonic flight, generally comprising in serial flow communication a fan 92 through which ambient air is propelled, a multistage compressor 94 for pressurizing the air, a combustor 96 in which the compressed air is mixed with fuel and ignited for generating an annular stream of hot combustion gases, and a turbine section 98 for extracting energy from the combustion gases. An accessory gearbox 93 is provided to drive accessories such as oil and fuel pumps. A starter/generator electric machine 95, engaged to the accessory gearbox 93, drives a rotor of the compressor 94 at engine startup and is driven during engine operation to generate electricity.

The electric machine 95 generally includes a rotor and a stator (See FIG. 3a), the stator having at least one winding in accordance with the invention (see below). The electric machine, as described in more detail below, is preferably of the type described in commonly-assigned U.S. Pat. No. 6,313,560 or U.S. co-pending application Ser. No. 10/444,952 (the contents of both of which are hereby incorporated by reference), though any suitable electric machine architecture may be employed. Such starter/generators are very compact due to the overall dimensional constraints for aircraft engine applications, and therefore can have very high current densities. Thus, extensive cooling of the windings becomes necessary. As will be described in greater detail below, one embodiment of the present invention provides more efficient cooling of the windings by laminar coolant fluid flow convective heat transfer.

The present invention generally provides a method of improving heat transfer in laminar coolant fluid flow by providing a coolant flow path which has successive and preferably mutually angled segments, each of which has a length selected to prevent laminar flow from fully developing therein, to thereby increase overall heat transfer.

Figure 2:
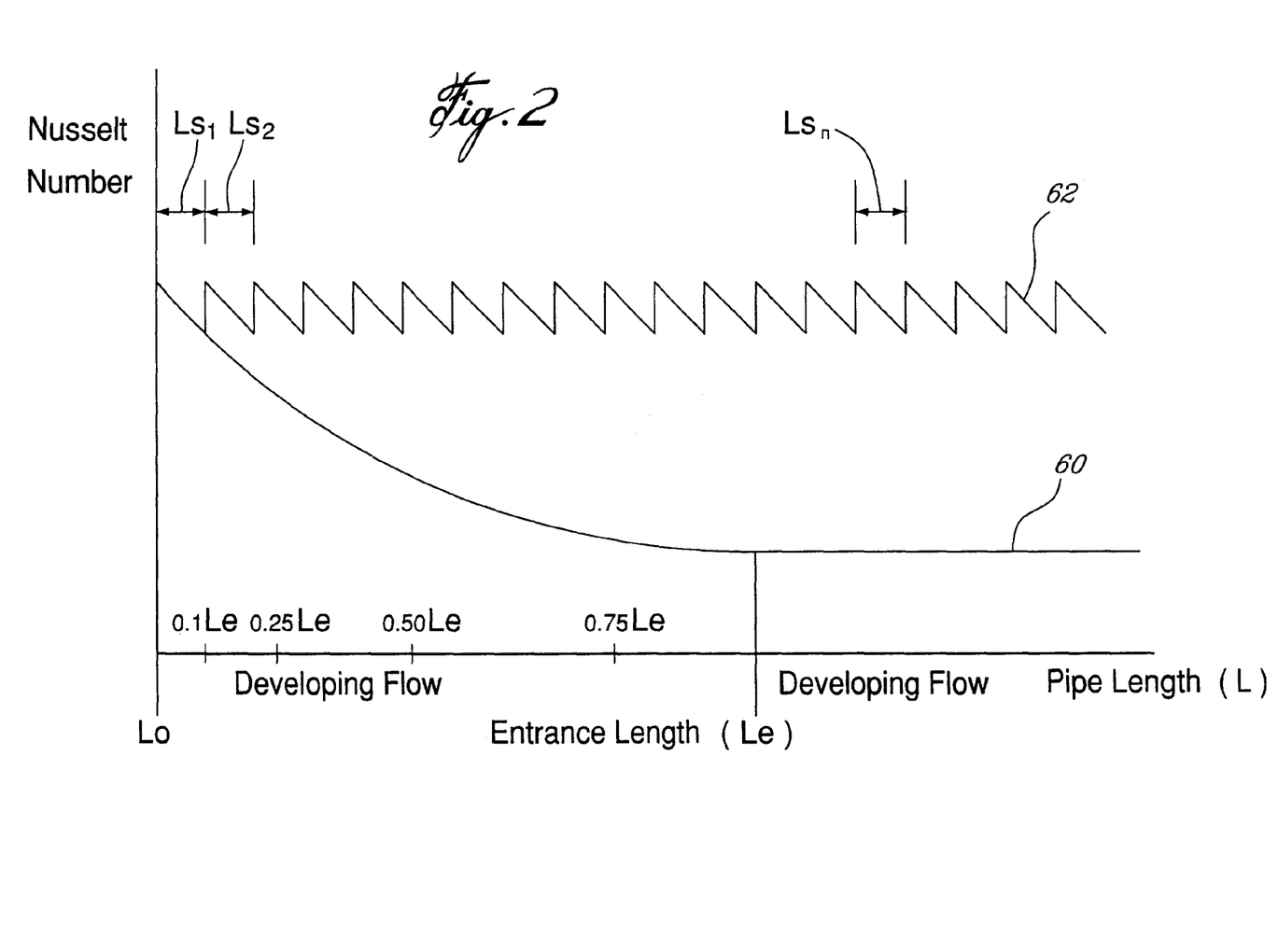
FIG. 2 shows a graph depicting Nusselt Number vs. Pipe Length for Laminar flow in a pipe.

By providing a plurality of short cooling channels for the coolant fluid, the convective heat transfer to the coolant flow is enhanced by making use of the so-called "entrance effect" of a pipe. The Nusselt number is a measure of convective heat transfer. The Nusselt number for a fluid conveyed though a pipe or channel is maximum at a pipe or channel entrance, and gradually decreases to a constant value as the laminar flow in the channel becomes developed. As seen in FIG. 2, the typical variation of the Nusselt number as a function of pipe length (L) in a straight pipe is depicted by curve 60. All other variables are assumed constant in this simple depiction. As the flow develops away from the entrance of the pipe ($L_0$) and along the pipe length (L), the Nusselt number gradually decreases until it stabilizes at a given level for fully developed laminar flow within the pipe. Boundary layers develop along the walls of the pipe as a result of the solid surface exerting a retarding shear force on the flow which reduces the speed of the flow near the walls. As the distance away from the entrance of the pipe ($L_0$) increases, the effect of the wall is "felt" further out into the flow. The flow in this region is said to be developing. At a given point away from the pipe entrance, the boundary layers developing on the walls reach the center line of the pipe, at which point the shape of the velocity profile no longer changes with any increasing distance. This point is called the "entrance length" (Le), after which the flow is said to be fully developed. The entrance length (Le) is therefore the length of pipe required for the flow to become fully developed. The entrance length (Le) is a function of pipe diameter (D) and Reynolds Number ($Re_D$), as follows:

$$L_e/D \approx 0.06 \, (Re_D) \quad \text{(Equation 1)}$$

Reynolds number ($Re_D$) is a dimensionless diameter which determines the nature of the flow regime (ie: laminar or turbulent) for incompressible fluid flow in a pipe/channel. For fluid flow in a pipe, Reynolds numbers less that about 2300 indicate laminar flow, and Reynolds number greater than about 4000 indicate turbulent flow. A Reynolds number between these values indicates that the flow is transitional. Reynolds number is calculated as follows:

$$Re = \rho V D/\mu \quad \text{(Equation 2)}$$

wherein $\rho$ is density, V is velocity, D is pipe diameter, and $\mu$ is dynamic viscosity. Thus, it will be understood that the transition between laminar flow and transitional flow is determined by the transition Reynolds number ($Re_T$), which is approximately equal to 2300. Accordingly, as laminar flow can have a Reynolds number up to 2300, the entrance length will be less than 138 times the pipe (channel segment) diameter.

As evident from FIG. 2, the Nusselt number, and hence convective heat transfer, is maximum at the pipe entrance ($L_0$) and decreases quite substantially as the flow develops therein. Accordingly, fully developed laminar flow has relatively low convective heat transfer capabilities, and is therefore generally less desirable in a heat exchange device.

In order to provide improved heat transfer, the present invention proposes to maintain a relatively high Nusselt number by providing a coolant channel, which will be described in greater detail below with reference to FIG. 3b, having succession of channel segments (e.g. 20, 22 in FIG. 3b), each of which has a length ($L_S$) which is less than the entrance length (Le). This is done to ensure that fully developed flow is not able to occur in each of the channel segments, thereby maintaining a high Nusselt number throughout the heat exchange device as schematically depicted in FIG. 2 by curve 62. In the depiction in FIG. 2, the heat exchange device has a plurality of successive segments 1, 2, . . . n, etc. (not shown in FIG. 2, but are like 20, 22 in FIG. 3) each having a segment length $L_{S1}$, $L_{S2}$, . . . $L_{Sn}$ etc. The pipe entrance Nusselt number is a theoretical maximum at the entrance of a channel segment (e.g. segment 1) and decreases along the length ($L_{S1}$) of the segment. However, in the present invention, the Nusselt number is permitted to decrease only a relatively small amount (by reason that $L_{Sn}$<Le, and preferably $L_{Sn}$<<Le as will be discussed further below) before the path of the next channel segment (e.g. segment 2) redirects the flow into a next successive channel segment, abruptly elevating the Nusselt number back to an entrance level at the entrance to segment 2. Segment length is thus controlled, according to Equation 1, to ensure that $L_S$<Le and thereby ensure a developing flow is maintained preferably throughout the entire length of the heat exchange device, and certainly through any section thereof where high heat transfer is desired.

Figure 3A:
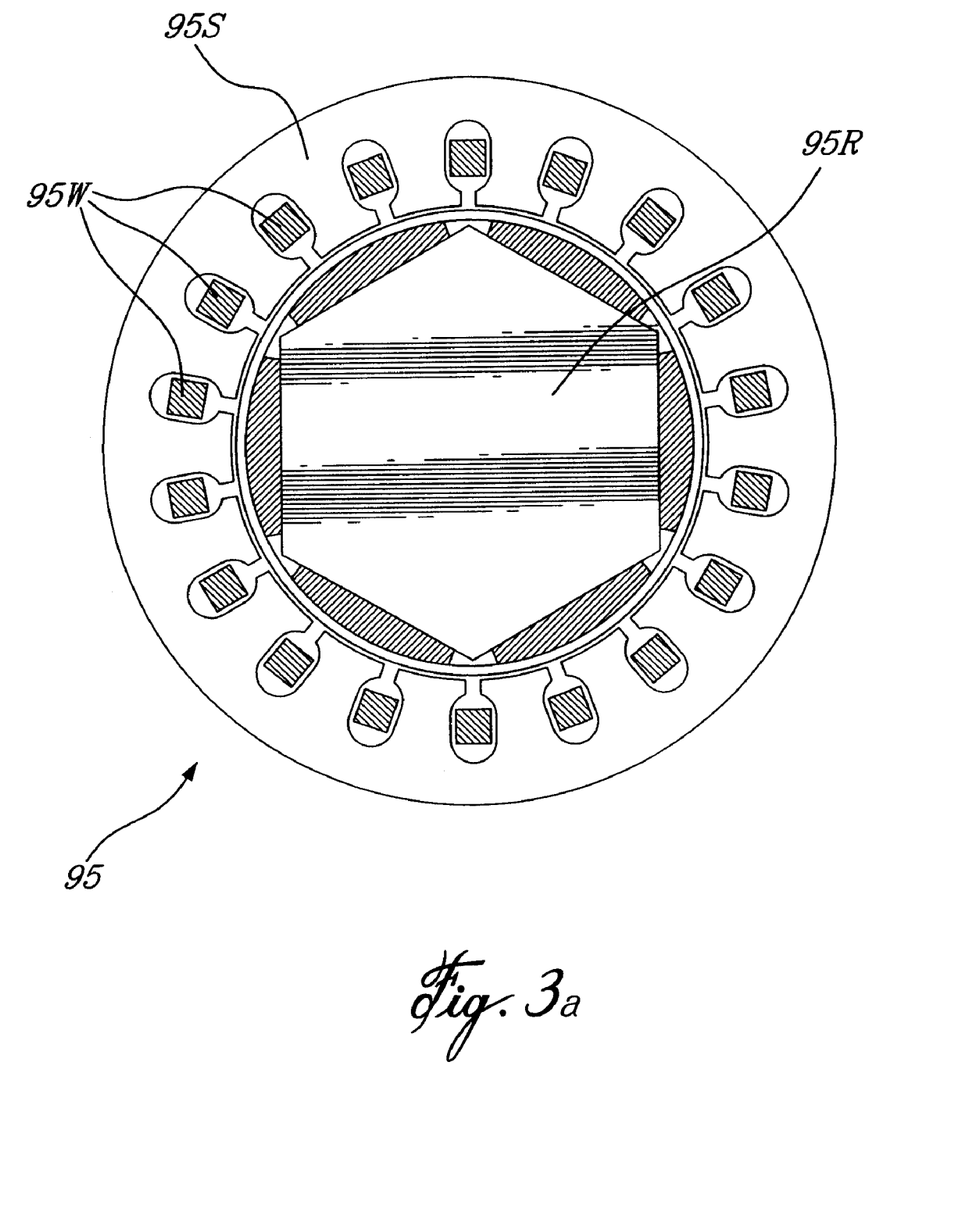
FIG. 3a is a top sectional view of an electric machine incorporating the present invention.
Figure 3B:
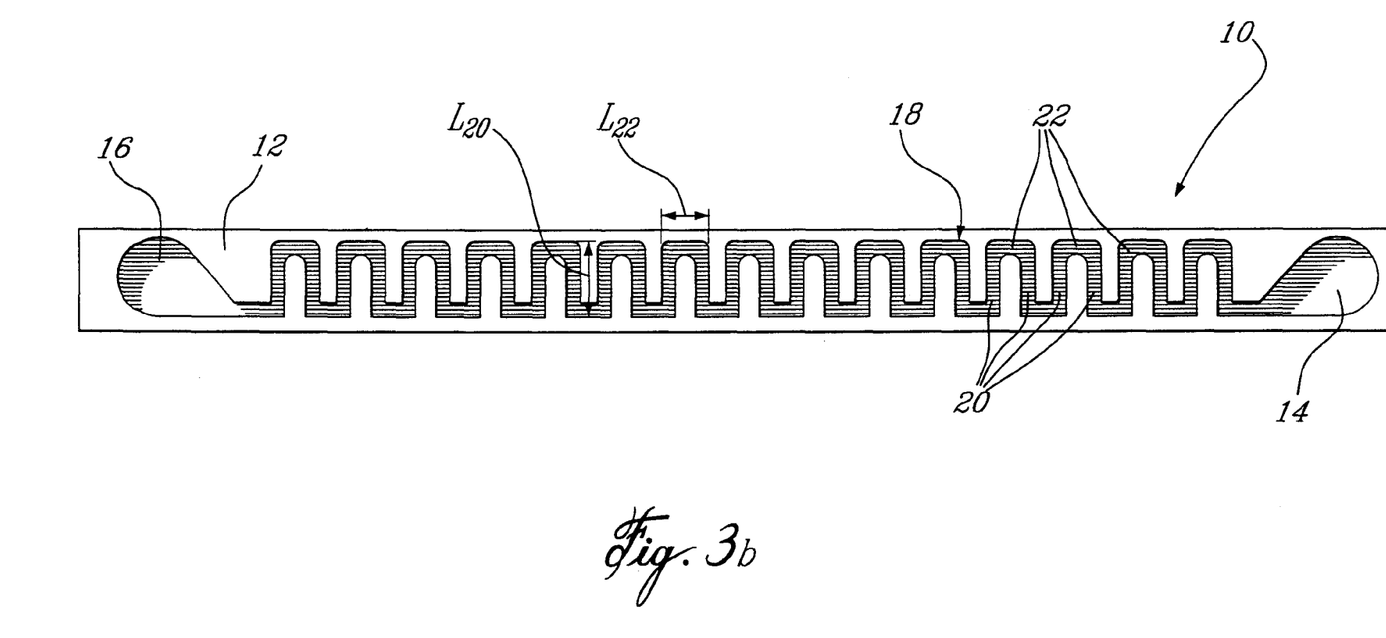
FIG. 3b is a section view of a bar-type conductor or winding from an electric machine having a tortuous fluid flow passage in accordance with the present invention.

Referring now to FIGS. 3a and 3b, the present invention is described with reference to an alternating current (AC) electric machine 95. Referring to FIG. 3a, the electric machine 95 in this embodiment includes at least a magnetic rotor 95R and a stator 95S having at least one current-carrying winding 95W disposed therein. Machine 95 may be operated as a motor or a generator, or both, though it will be understood that heat dissipation in windings 95W will typically be a greater concern in a generator application. Typically, three-phase windings will be provided in such a machine, such that there will be at least three separate windings 95W. Winding (s) 95W are preferably bar-type conductors of sufficient size such that the invention may be provided therethrough, as will be described further below. The windings 95W in successive slots are typically appropriately connected by end turns (not shown) or a squirrel cage (not shown), depending on the machine type.

Referring now to FIG. 3b, a portion 10 of a winding 95W is depicted in axial cross-section, such that the inside of the winding portion is visible. Portion 10, in this embodiment, represents the portion of the winding disposed in a slot of stator 95S (i.e. the portion of the winding between successive end turns). Typically, it is this "leg" portion of the winding which has the most difficult heat rejection requirements. The winding portion 10 comprises a winding conductor body 12, with at least one peripheral surface on an outer side thereof which acts as a heat exchange surface of the winding 10, 95W. The winding conductor body 12 can be any suitable conductor material (e.g. copper, aluminum, etc.) within which a tortuously-shaped coolant flow passage 18 formed in fluid flow communication between a coolant fluid inlet 14 at one end of the winding and a coolant fluid outlet 16 at an opposed end of the winding. A source of coolant, such as an oil system (not shown) of gas turbine engine 90 is in fluid communication with inlet 14 to provide 'fresh' coolant thereto, and with outlet 16 to retrieve 'spent' coolant therefrom for return to the oil system. In this embodiment, the tortuous coolant flow passage 18 defined through the interior of the portion 10 is in a serpentine and sinuous configuration which includes a plurality of alternating first channel segments 20 and second channel segments 22 in fluid flow communication and arranged substantially perpendicular to one another. Each channel segment has a length, L20 and L22, respectively, which is chosen to be less than the entrance length (Le) to thereby maintain a developing flow and thus prevent the laminar flow from becoming fully developed in the segment, as will be described in more detail below. To satisfy envelope requirements in this case, second segment length L22 is less than the length L20 of the first channel segments 20, however each segment 20, 22 may have any segment length desired within the design constraints, and successive segments need be neither the same nor symmetrical.

Referring again to FIG. 2, it is preferred that the length ($L_{Sn}$) of a given segment is less than the pipe entrance length (Le) for that segment (i.e. $L_{Sn}$<Le, where Le is preferably determined according to Equation 1). In an ideal situation, it is desired the length ($L_{Sn}$) of a given segment is as short as possible (e.g. $L_{Sn}$<0.05 Le or $L_{Sn}$<0.1 Le) to provide maximum heat transfer effect for a for a given Reynolds number. In theory, a constant Nusselt number equal to the theoretical maximum is desired (i.e. line 62 is at the highest possible Nusselt number and is a smooth horizontal line) however design constraints such envelope geometry, constraints on maximum allowable coolant pressure, flow rate and/or temperature, and so forth, may require a longer segment length in order to ensure optimization of the overall heat exchange system. In such instances, a segment length of $L_S$<0.25 Le, $L_S$<0.5 Le, and $L_S$<0.75 Le are alternately preferred, in decreasing order of preference. As mentioned, any segment length less than the pipe entrance length (Le) for that segment will provide a measurable benefit over a channel having a fully developed laminar flow. It will be understood that, while symmetry is preferred, segment length and direction may vary from segment to segment, as required or desired. As a general guideline, the shortest segment length(s) possible within the available pressure loss is preferably selected.

Referring again to FIG. 3b, in use, as the coolant fluid flows through the fluid channel 18 from the inlet 14 to the outlet 16 via the successive channel segments 20 and channel segments 22, in this case the length and angles of the successive segments is selected such that the laminar flow therethrough is impeded, and more preferably prevented altogether, from fully developing, such that a so-called developing flow is maintained throughout passage 18. (As mentioned earlier, the segment lengths $L_{20}$, $L_{22}$ are selected to also satisfy envelope considerations, with $L_{20}$ being dictated by the width of the winding portion 10.) This therefore increases the overall convective heat transfer efficiency by maintaining a relatively higher Nusselt number throughout the entire coolant flow passage 18, relative to a standard straight pipe passage.

Thus the transition from one channel segment to the next is equivalent to a new pipe entrance for the laminar flow, as each segment has a length less than that required for the laminar flow to become fully developed. As a result, maintaining a preferably continuously undeveloped flow results in a considerably higher average Nusselt number than is achieved with fully developed laminar flow. This therefore significantly improves heat transfer between the body 12 and the fluid flowing through the passage 18.

It will also be apparent, with reference to Equation 1, although controlling segment length as is preferred, segment diameter may be controlled (i.e. controllably varied) instead, or as well, to maintain a transitional flow in the desired segments. It will also be understood that, when considering segment length alone in context of the present invention changes in the direction of successive segments are desired to create an entrance effect in the following segment, however when channel diameter is also or alternately considered, changes in segment direction may not be required to effect an entrance effect into a successive segment of differing diameter relative to the previous segment. Thus, while the preference is for a "tortuous" path, it is not necessary.

Figure 4:
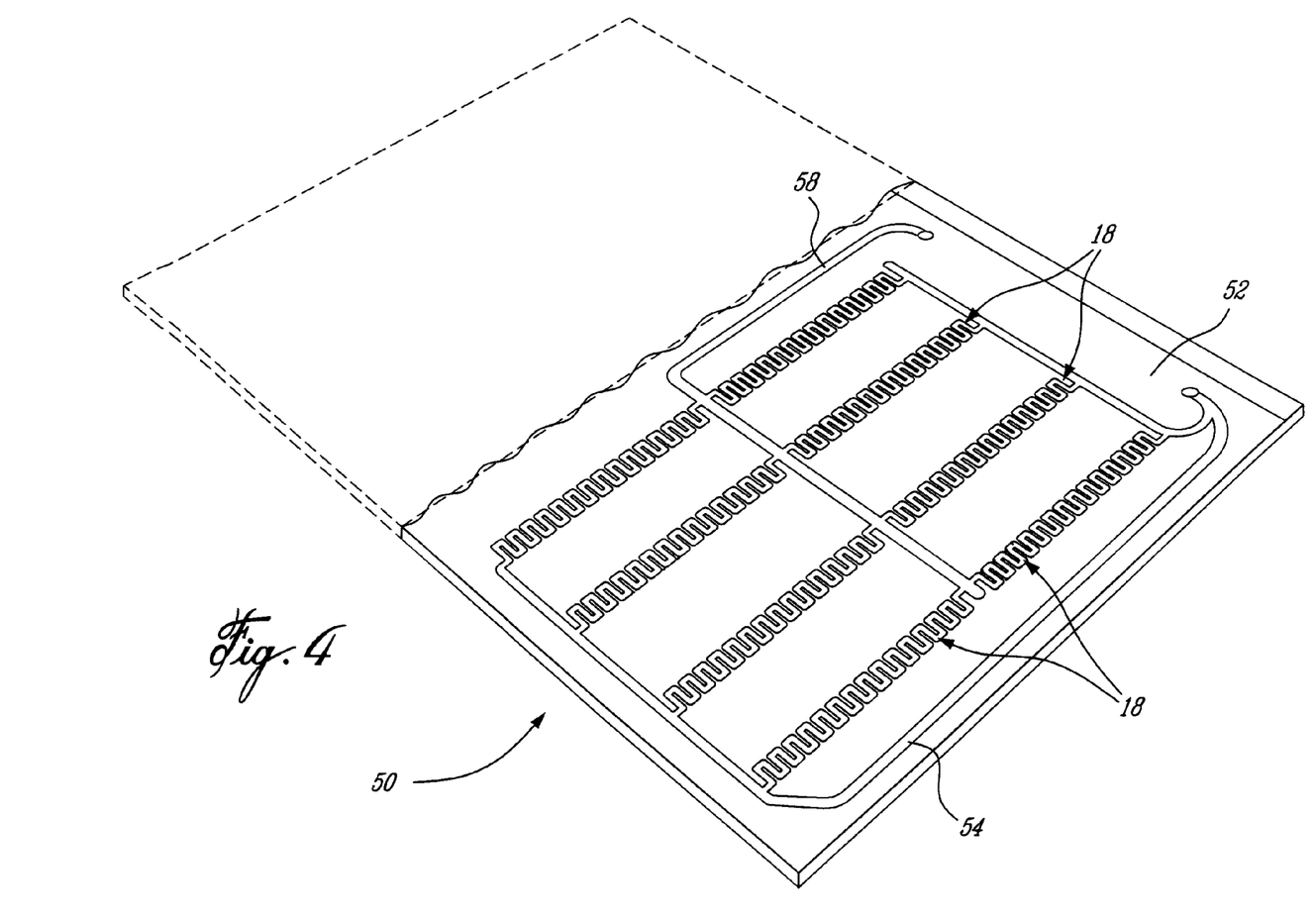
FIG. 4 is a perspective sectional view of a heat sink plate having tortuous fluid flow passages in accordance with the present invention.

Referring to FIG. 4, in an alternate tortuous path application of the coolant flow passage 18 of the present invention, a heat sink 50, which may be used to dissipate heat from electronic equipment for example, includes a conducting plate 52 made from any suitable material such as aluminum, within which several coolant flow passages 18 are formed. In the heat sink 50 shown, and inlet coolant passage 54, to which a coolant supply (not shown) provides a source of coolant fluid, feeds fluid to one or more, and preferably all of the aligned coolant flow passages 18 in parallel, and a common coolant fluid exit passage 56 in fluid flow communication with the outlet of each of the coolant flow passages directs the fluid out of the heat sink for subsequent recirculation ultimately back to the coolant supply.

Each of the coolant flow passages 18 of the present invention is preferably a single enclosed passage having a plurality of successive segments, all extending in a common plane, as seen in FIG. 3b and FIG. 4, defined within the body 12 of the heat exchange device 10. Each of the channel segments has a length less than a distance required for laminar flow to become fully developed therein. Thus, exact length control of each channel segment of the coolant flow passage is preferable to ensure a predetermined maximum length of each segment, which is less than the entrance length, is maintained. In one embodiment of the present invention, this is achieved by photochemical etching the coolant flow passages within the conductive body of the heat exchanging device. This preferably ensures that the repetitive pipe inlet effect maintains an undeveloped laminar flow throughout the coolant passage thereby improving convective heat transfer efficiency throughout the heat exchange device.

Figure 5A:
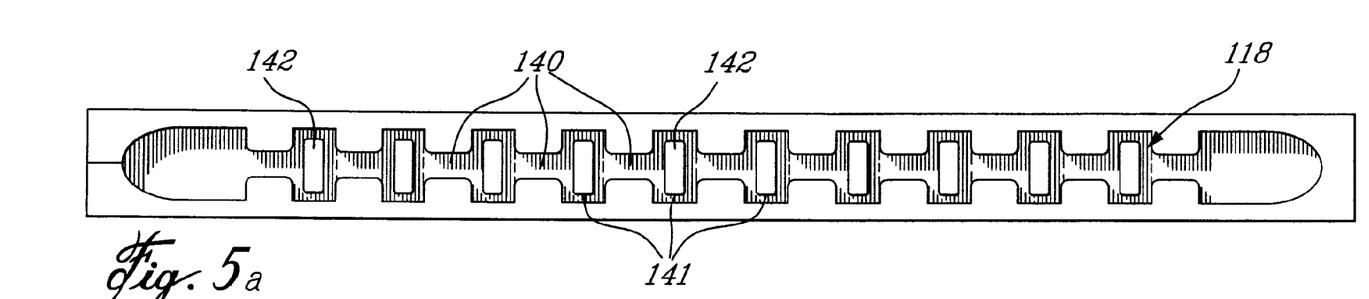
FIGS. 5a-5c are similar to FIG. 3, showing alternate embodiments of the present invention.
Figure 5B:
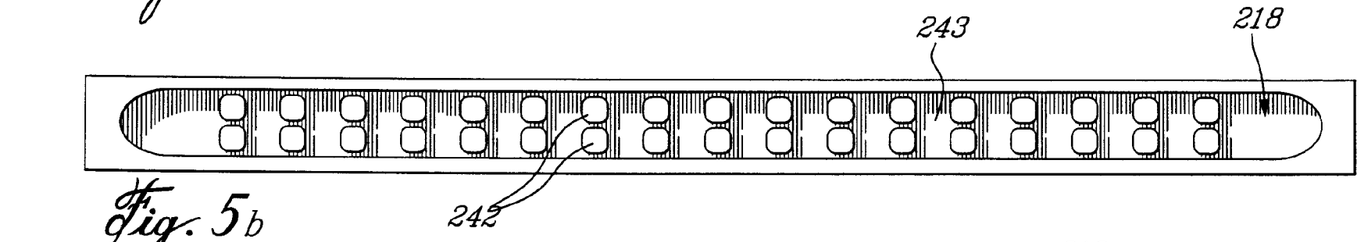
Figure 5C:
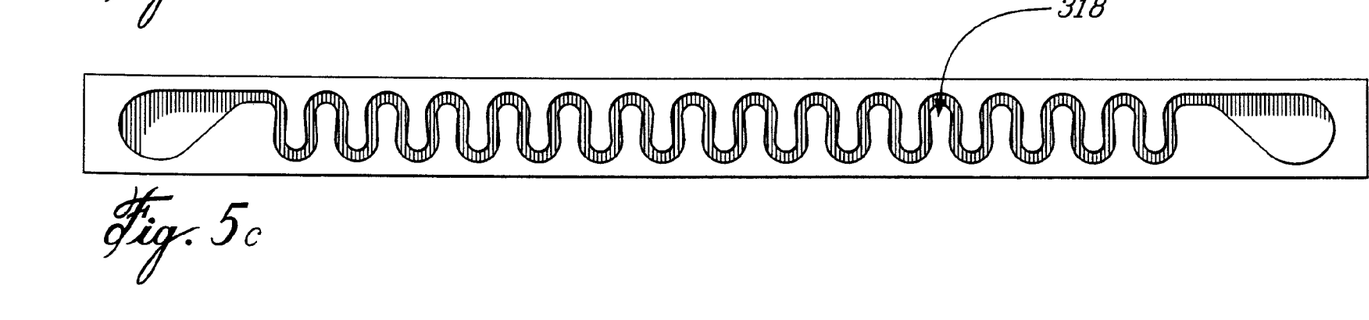

Although the serpentine configuration of the fluid flow passage 18 of FIGS. 3 and 4 is preferred as producing good heat transfer results, alternate configurations of the fluid flow path are possible. Referring to FIGS. 5a to 5c, three example alternate fluid flow passages are depicted. In FIG. 5a, the fluid flow passage 118 comprises alternating narrow horizontal channels 140 and larger rectangular openings 141 within which dividers 142 force fluid flow to split around said dividers in perpendicular channel segments. In FIG. 5b, the fluid flow passage 218 is formed by an elongated channel opening 243 which has successive channel segments defined by a plurality of projecting flow dividers 242 preferably arranged in pairs the length of the large channel opening. In FIG. 5c, the fluid flow passage 318 is formed by a continuous substantially sinusoidal-shaped curved path. Regardless of the particular configuration, each fluid flow passage 118, 218, 318 comprises a plurality of channel segments, each of which has a length ($L_{Sn}$) which is less than the entrance length (Le). Accordingly, the pipe inlet effect for the laminar flow is maintained throughout the length of the fluid flow passage (i.e. a developing flow is maintained), thus improving heat transfer relative to a fully-developed laminar fluid flow passage.

Throughout this description, the terms "pipe", "channel", "passage", etc. are used interchangeably to describe a fluid transporting device, and are not intended to refer to or be limited to a specific geometry or configuration or apparatus.

The invention may be applied to any apparatus for constrained fluid transport in which a inlet entry effect, transitional zone, and fully-developed laminar flow phenomena can exist.

The above description is meant to be exemplary only, and one skilled in the art will recognize that changes may be made to the embodiments described without departing from the scope of the invention disclosed. For example, although the electrical winding and heat sink plate are described as being made of copper or aluminum, any suitable conducting materials can be used. Further, although two exemplary applications are provided above for the present invention, the present invention can be employed in many other applications in which turbulent flow is not present. Furthermore, although a sinusoidal or serpentine passage is preferred, and suitable channel configuration may be provided. In tortuous path configurations, perpendicular angles are preferred between segments, but are not necessary, and acute or obtuse angle may be used. Although a regular repetition of segments geometry (ies) is preferred, any length and diameter may be selected for a given segment, and successive segments may be provided in any desired density to achieve the desired heat transfer within the given system constraints. Segment sizes need not be identical nor symmetrical relative to one another. The channels need not necessarily have constant flow areas nor be linear. In other words, channel geometry, angles, size, etc. may be tailored almost infinitely as required to suit the designer's needs. Also, although generally described with respect to a channel defined in a solid body, the skilled reader will appreciate that the channel geometry of the present invention may be applied in a variety of forms (e.g. conduits, pipes, etc.). The two-dimensional examples have been provided for ease of explanation, but the invention may also be applied three-dimensionally. The invention may be used for heating or cooling the surrounding environment. The heat exchange device may include further means (according to this invention or otherwise) for transferring heat from the channel environment to/from yet another fluid or medium (e.g. such as a fuel-oil heat exchanger, etc.). Still other modifications will be apparent to those skilled in the art, in light of a review of this disclosure, and such modifications are intended to fall within the appended claims.

We claim:

1. A heat exchange device comprising a body having at least one coolant flow passage formed therein, the coolant flow passage being a single enclosed passage formed within said body, the single enclosed passage having a plurality of linear channel segments in serial fluid flow communication such that each segment communicates directly with only one upstream segment and one downstream segment, each of said segments extending from an inlet to an outlet and having a segment channel axis therethrough, in use a coolant flow through each segment being directed along the segment channel axis, the channel axes of successive segments disposed substantially perpendicularly relative to one another and all of said channel axes being located in a common plane defined within said body, each segment having a length less than a length required for fully-developed laminar flow and thereby causing a pipe inlet effect in each segment, and wherein the body is a monolithic current-carrying winding of an electric machine and the coolant flow passage is formed in at least one peripheral surface of the body.

2. The heat exchange device as defined in claim 1, wherein the segments are substantially equal in length to one another.

3. The heat exchange device as defined in claim 1, wherein the length of each of said segments is less than three-quarters of said length required for said fluid to achieve a fully developed laminar flow in said segment.

4. The heat exchange device as defined in claim 1, wherein the length of each of said segments is less than half of said length required for said fluid to achieve a fully laminar flow in said segment.

5. The heat exchange device as defined in claim 1, wherein the length of each of said segments is less than one-quarter of said length required for said fluid to achieve a fully laminar flow in said segment.

6. A heat exchange device comprising a body defining at least one tortuous coolant flow passage, said body having at least one peripheral surface thereon in conductive heat transfer communication with said coolant flow passage, each coolant flow passage being a single enclosed passage formed by a plurality of serially connected and perpendicularly-oriented channel segments in serial fluid flow communication such that immediately successive channel segments are disposed perpendicularly to one another, all of said channel segments extending in a common plane defined within said body, each of said segments having a length less than a length required for said fluid to achieve a fully developed laminar flow therein, each channel segment being configured such that the Nusselt number of the flow therethrough decreases only insubstantially to a minimum Nusselt number value higher than that corresponding to laminar flow, the successive channel segments being relatively oriented such that the Nusselt number of the flow therethrough is abruptly elevated when the flow enters each successive channel segment, and wherein the body is a monolithic current-carrying winding of an electric machine, and the coolant flow passage is formed in the at least one peripheral surface the body.

7. The heat exchange device as defined in claim 3, wherein each of said channel segments has a linear channel axis extending between an inlet and an outlet thereof, a coolant flow through each of said channel segments being along the linear channel axis, said channel axis of successive ones of said channel segments being substantially perpendicular to each other.

8. The heat exchange device as defined in claim 7, wherein the outlet of each of said channel segments being connected only to the inlet of a single successive one of the channel segments downstream therefrom, such that coolant flow through each of said channel segments flows completely into the single successive one of said channel segments downstream.

9. The heat exchange device as defined in claim 6, wherein the segments are substantially equal in length.

10. The heat exchange device as defined in claim 6, wherein said segment length is less than three-quarters of said length required for said fluid to achieve a fully developed laminar flow in said segment.

11. The heat exchange device as defined in claim 6, wherein said segment length is less than half of said length required for said fluid to achieve a fully laminar flow in said segment.

12. The heat exchange device as defined in claim 6, wherein said segment length is less than one-quarter of said length required for said fluid to achieve a fully laminar flow in said segment.

13. The heat exchange device as defined in claim 6, wherein the successive channel segments are relatively oriented such that the Nusselt number of the flow therethrough is maximum when the flow enters each successive channel segment.

* * * * *